(12) United States Patent
Tsai (10) Patent No.: US 7,240,816 B2
(45) Date of Patent: Jul. 10, 2007

(54) VEHICLE-CARRIED RACK FOR BICYCLES

(76) Inventor: David Tsai, No. 113-9, Gin-Chen Road, Ho Ping Li, Chang Hua City (TW)

( * ) Notice: Subject to any disclaimer, the term of this patent is extended or adjusted under 35 U.S.C. 154(b) by 334 days.

(21) Appl. No.: 10/945,386

(22) Filed: Sep. 20, 2004

(65) Prior Publication Data
US 2005/0061842 A1 Mar. 24, 2005

(30) Foreign Application Priority Data
Sep. 24, 2003 (TW) .............................. 92126313 A (51) Int. Cl.
*B60R 9/00* (2006.01)
*B60R 11/00* (2006.01)

(52) U.S. Cl. .................. 224/501; 224/510; 224/924; 224/519; 224/502; 211/21; 211/195

(58) Field of Classification Search ........ 224/500–507, 224/519, 552, 331, 497, 549, 282, 495, 924, 224/509, 521; 108/44; 211/195, 17–22, 211/104, 115, 117, 118; 414/462
See application file for complete search history.

(56) References Cited

U.S. PATENT DOCUMENTS

| | | | | |
|---|---|---|---|---|
| 4,823,997 A * | 4/1989 | Krieger | ................. | 224/501 |
| 5,690,260 A * | 11/1997 | Aikins et al. | ................ | 224/505 |
| 5,752,636 A * | 5/1998 | Manley | ...................... | 224/405 |
| 6,006,973 A * | 12/1999 | Belinky et al. | ............. | 224/510 |
| 6,019,266 A * | 2/2000 | Johnson | ...................... | 224/534 |
| 6,089,430 A * | 7/2000 | Mehls | ........................ | 224/509 |
| 6,443,345 B1 * | 9/2002 | Bloemer et al. | ............ | 224/519 |
| 6,523,731 B1 * | 2/2003 | Pedrini | ........................ | 224/537 |
| 6,695,184 B2 * | 2/2004 | Higginbotham, III | ....... | 224/501 |
| 6,732,984 B2 * | 5/2004 | Tsai | ........................ | 248/125.1 |
| 6,761,297 B1 * | 7/2004 | Pedrini | ........................ | 224/519 |
| 7,044,347 B1 * | 5/2006 | Pedrini | ........................ | 224/501 |
| 2004/0191037 A1 * | 9/2004 | Potts | ........................... | 414/462 |

* cited by examiner

Primary Examiner—Nathan J. Newhouse
Assistant Examiner—Corey N. Skurdal
(74) Attorney, Agent, or Firm—Alan Kamrath; Kamrath & Associates PA (57) ABSTRACT

A rack for supporting at least one bicycle in position includes a base. Two beams are pivotally connected with the base. At least one supporting device is attached to each of the beams in order to support one wheel of the bicycle. A post is pivotally connected with the base. A hooking device is attached to the post in order to hook the bicycle.

20 Claims, 12 Drawing Sheets

ID OF INVENTION

The present invention relates to a vehicle-carried rack for bicycles.

BACKGROUND OF INVENTION

Figure 11:
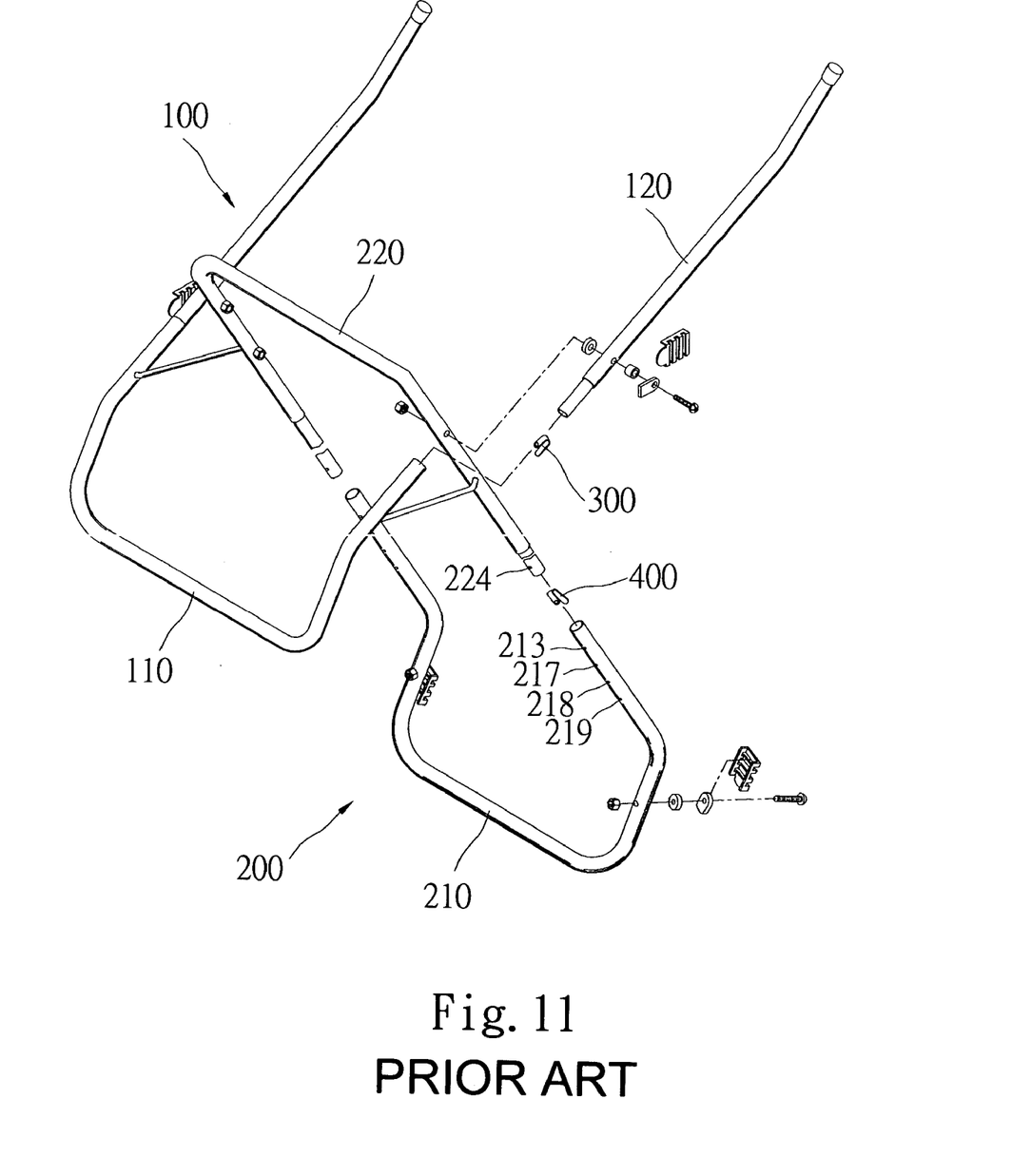
FIG. 11 is an exploded view of a conventional rack for bicycles.
Figure 12:
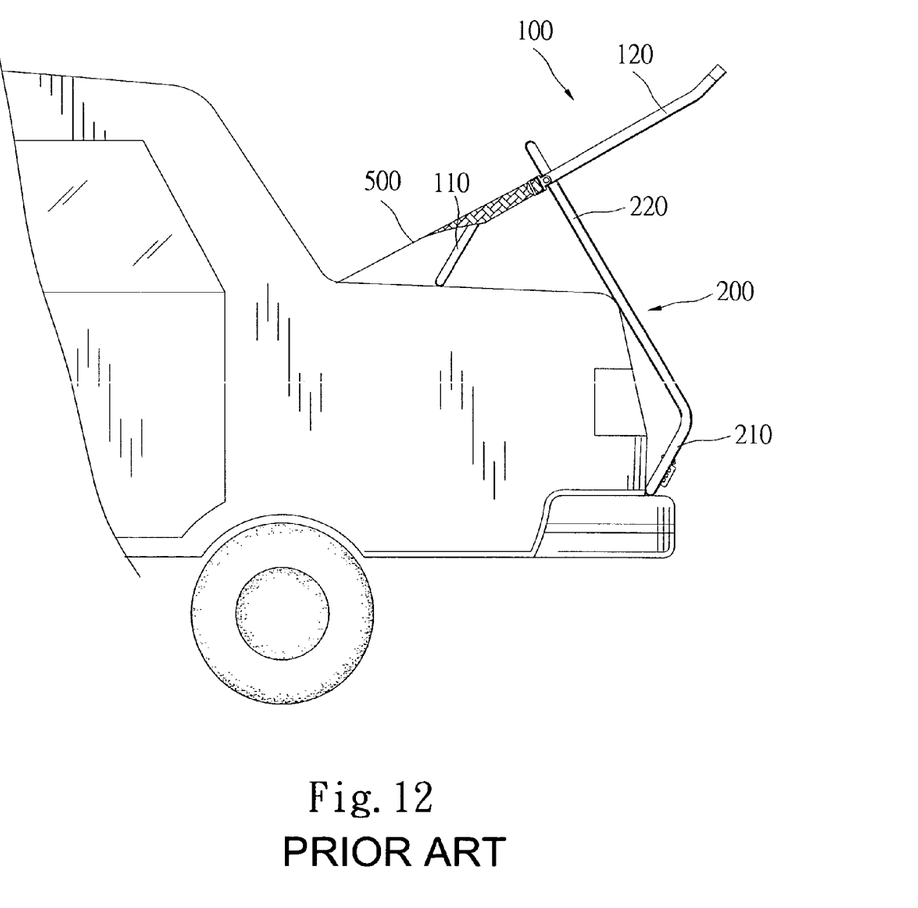
FIG. 12 is a side view of a bicycle carried on a vehicle by the conventional rack shown in FIG. 11.

Referring to FIG. 11, a conventional rack includes a first frame 100 and a second frame 200. The first frame 100 includes a U-shaped element 110 and two rectilinear elements 120. The U-shaped element 110 includes two ends each for receiving an end of one rectilinear element 120. A spring-biased detent 300 is provided in order to lock each rectilinear element 120 to one end of the U-shaped element 110. The second frame 200 includes two U-shaped elements 210 and 220. The U-shaped element 210 includes two ends each for receiving one end of the U-shaped element 220. A spring-biased detent 400 is provided in order to lock each end of the U-shaped element 220 to one end of the U-shaped element 210. Each end of the U-shaped element 220 defines an aperture 224. Each end of the U-shaped element 210 defines four apertures 213, 217, 218 and 219. The spring-biased detent 400 can be inserted in the aperture 213, 217, 218 or 219 through the aperture 224. Thus, the length of the second frame 200 is adjustable. To connect the first frame 100 with the second frame 200, each rectilinear element 120 is connected with one end of the U-shaped element 220. In use, referring to FIG. 12, the U-shaped element 110 is put on the trunk or boot of a vehicle. The U-shaped element 210 is put on the rear bumper of the vehicle. Two belts 500 are wound around the trunk or boot. Each belt 500 includes an end tied to an end of the U-shaped element 110 and another end tied to an end of the U-shaped element 210. The upper tube of a bicycle can be supported on the rectilinear elements 120. However, the bicycle tends to slide on the rectilinear elements 120.

The present invention is therefore intended to obviate or at least alleviate the problems encountered in the prior art.

SUMMARY OF INVENTION

According to the present invention, a rack is provided for holding at least one bicycle in position. The rack comprising a base, two beams pivotally connected with the base, at least one supporting device attached to each of the beams in order to support one wheel of the bicycle, a post pivotally connected with the base, a hooking device attached to the post in order to hook a portion of the bicycle. The primary advantage of the rack is the ability of holding the bicycle in position.

Other objects, advantages and novel features of the invention will become more apparent from the following detailed description in conjunction with the attached drawings.

BRIEF DESCRIPTION OF DRAWINGS

The present invention will be described via detailed illustration of embodiments referring to the drawings.

DETAILED DESCRIPTION OF EMBODIMENTS

Figure 1:
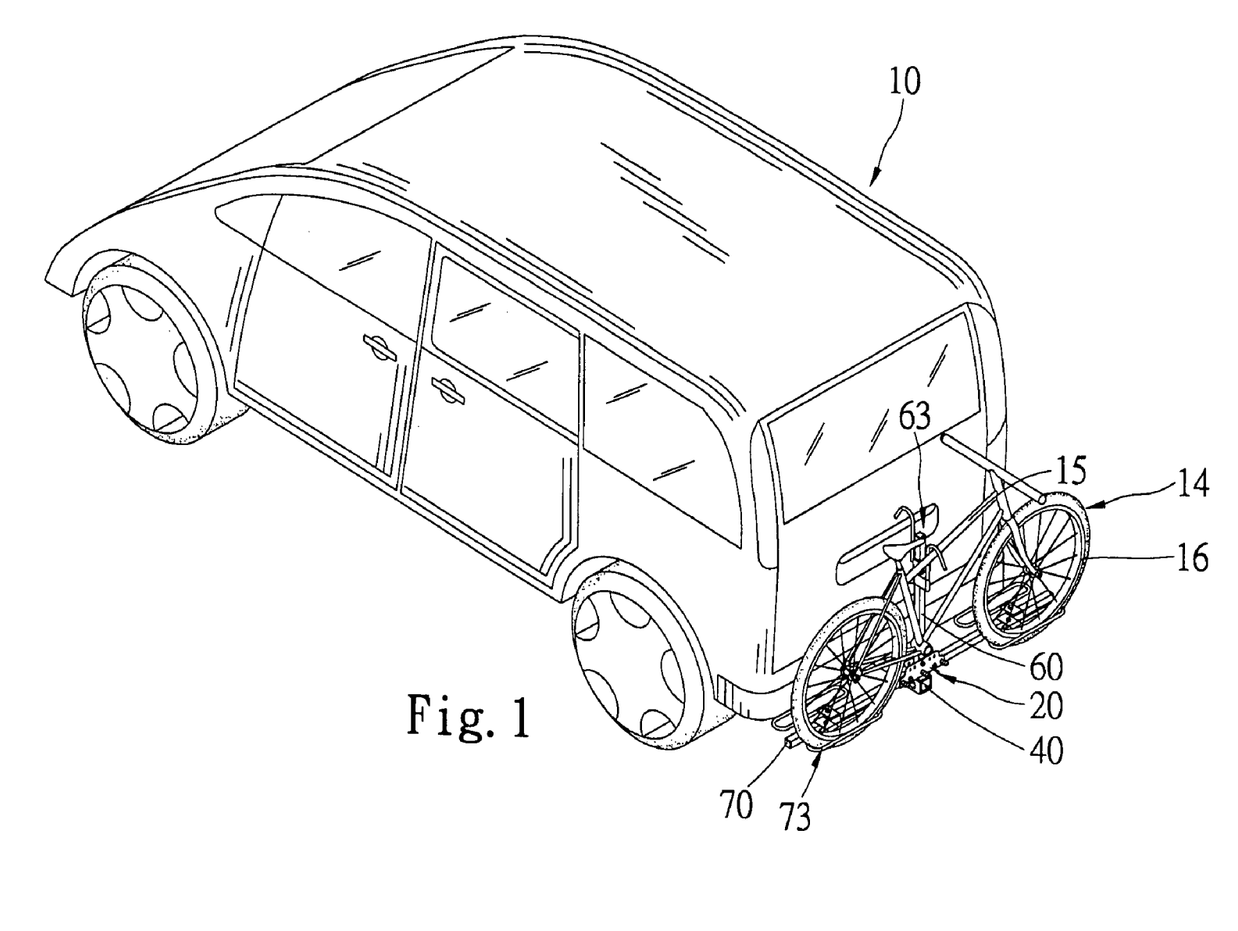
FIG. 1 is a perspective view of a bicycle carried on a vehicle by a rack according to the preferred embodiment of the present invention.

Referring to FIG. 1, a bicycle 14 is carried on a vehicle 10 by a rack 20 according to the preferred embodiment of the present invention.

Figure 2:
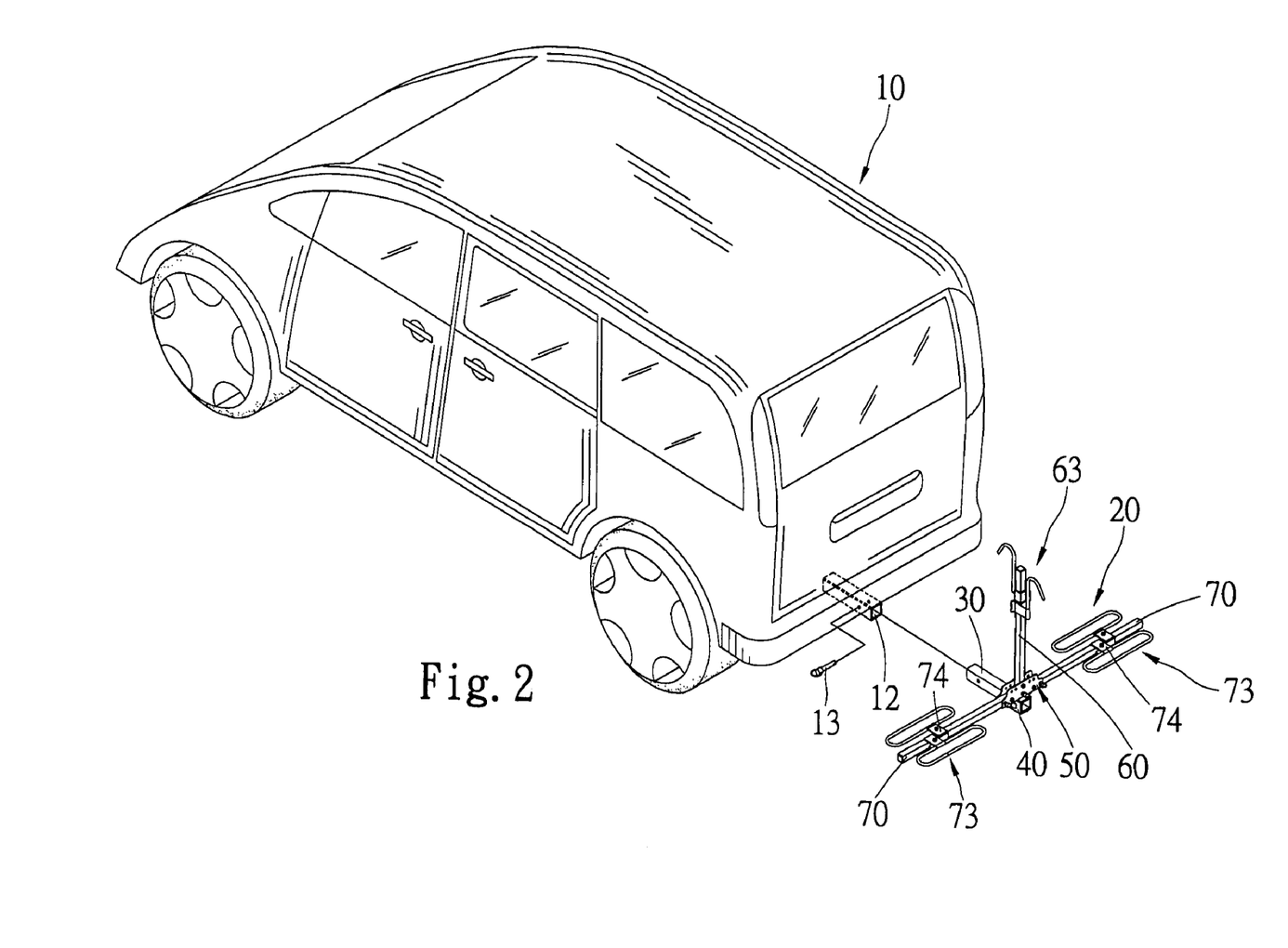
FIG. 2 is a perspective view of the vehicle and the rack shown in FIG. 1 but shows the rack detached from the vehicle.

Referring to FIGS. 2, the rack 20 is detached from the vehicle 10. A socket 12 is secured to the vehicle 10. An insert 30 of the rack 20 can be inserted in the socket 12. A pin 13 can be driven in the insert 30 through the socket 12. Therefore, the rack 20 can be attached to the vehicle 10 as shown in FIG. 1.

Figure 3:
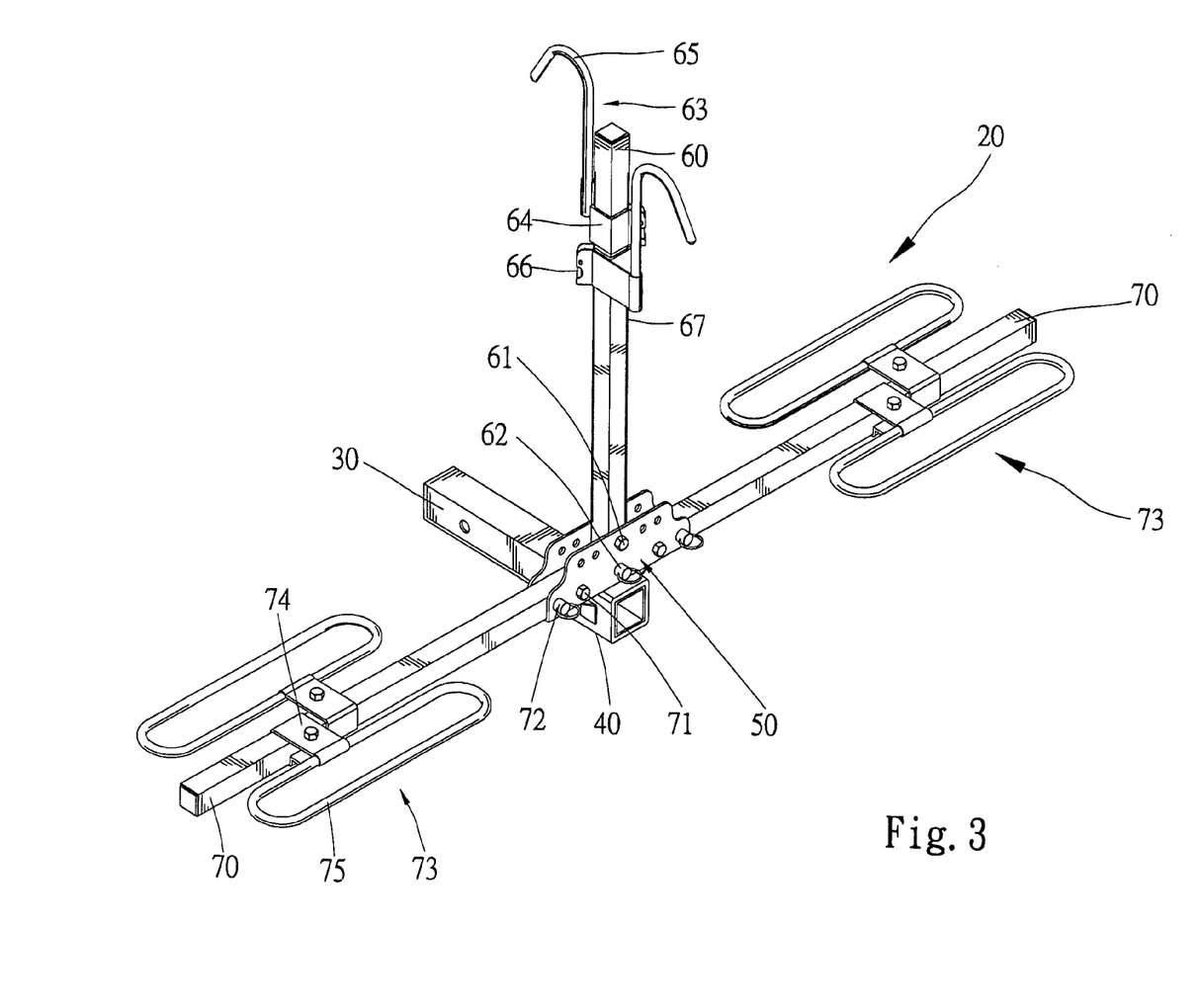
FIG. 3 is an enlarged perspective view of the rack shown in FIG. 2.

Referring to FIG. 3, the rack 20 includes a collar 40 that can be put around the insert 30, a base 50 secured to the collar 40, two beams 70 pivotally connected with the base 50, two supporting devices 73 movably installed on each beam 70, a post 60 pivotally connected with the base 50 and two hooking devices 63 movably installed on the post 60. A wheel 16 (FIG. 2) of the bicycle 14 can be supported on each supporting device 73. The upper tube 15 of the bicycle 14 can be hooked by each hooking device 63.

Figure 4:
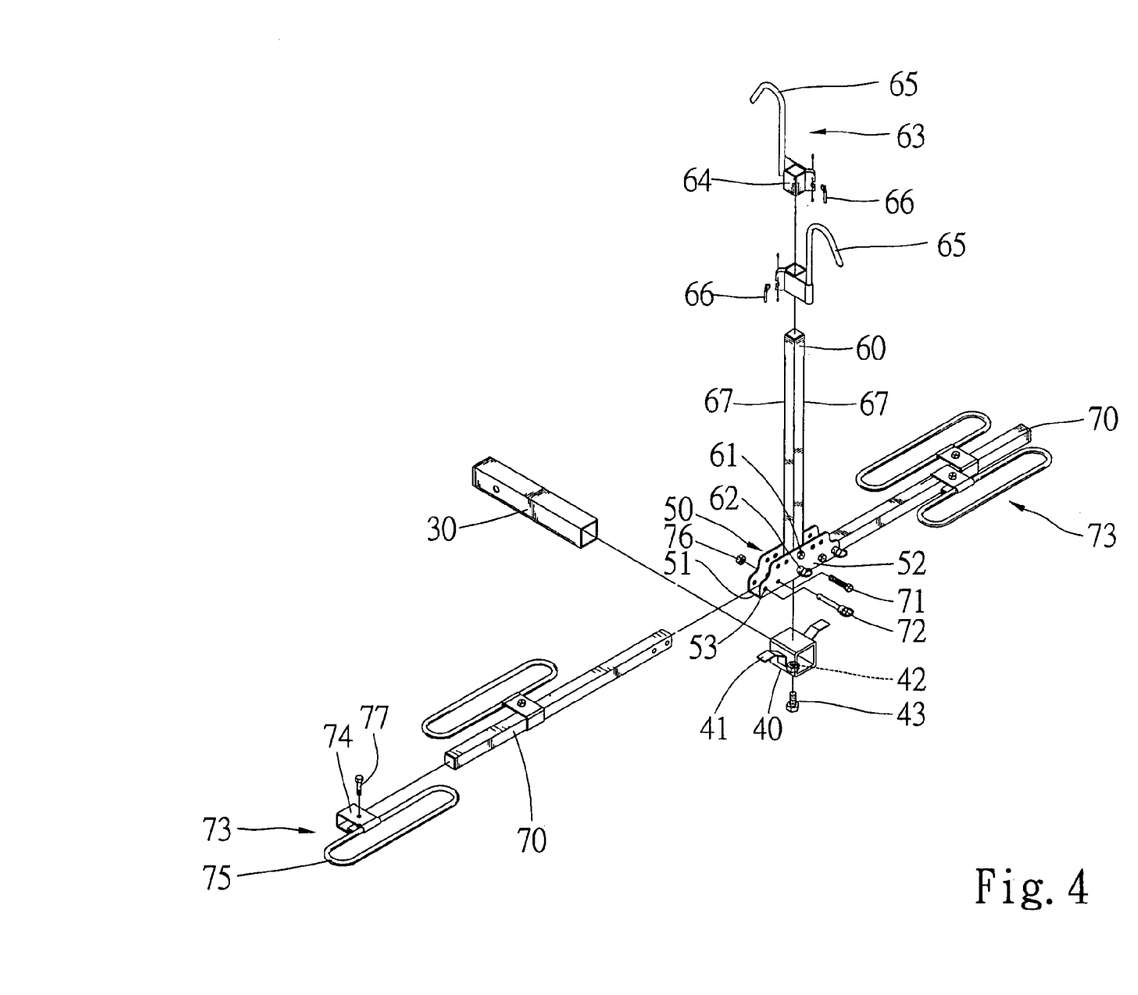
FIG. 4 is an exploded view of the rack shown in FIG. 3.

Referring to FIG. 4, the collar 40 includes two wings 41 secured thereto and a nut 42 secured thereto. A screw 43 is engaged with the nut 42. In assembly, the collar 40 is put around the insert 30. The screw 43 is driven in the collar 40. Thus, the insert 30 is abutted by the screw 43. Therefore, the collar 40 is secured to the insert 30.

The base 50 includes a bottom 51 and two walls 52 extending from the bottom 51. A plurality of apertures 53 is defined in each wall 52. The bottom 51 is secured to the collar 40 including the wings 41.

Figure 10:
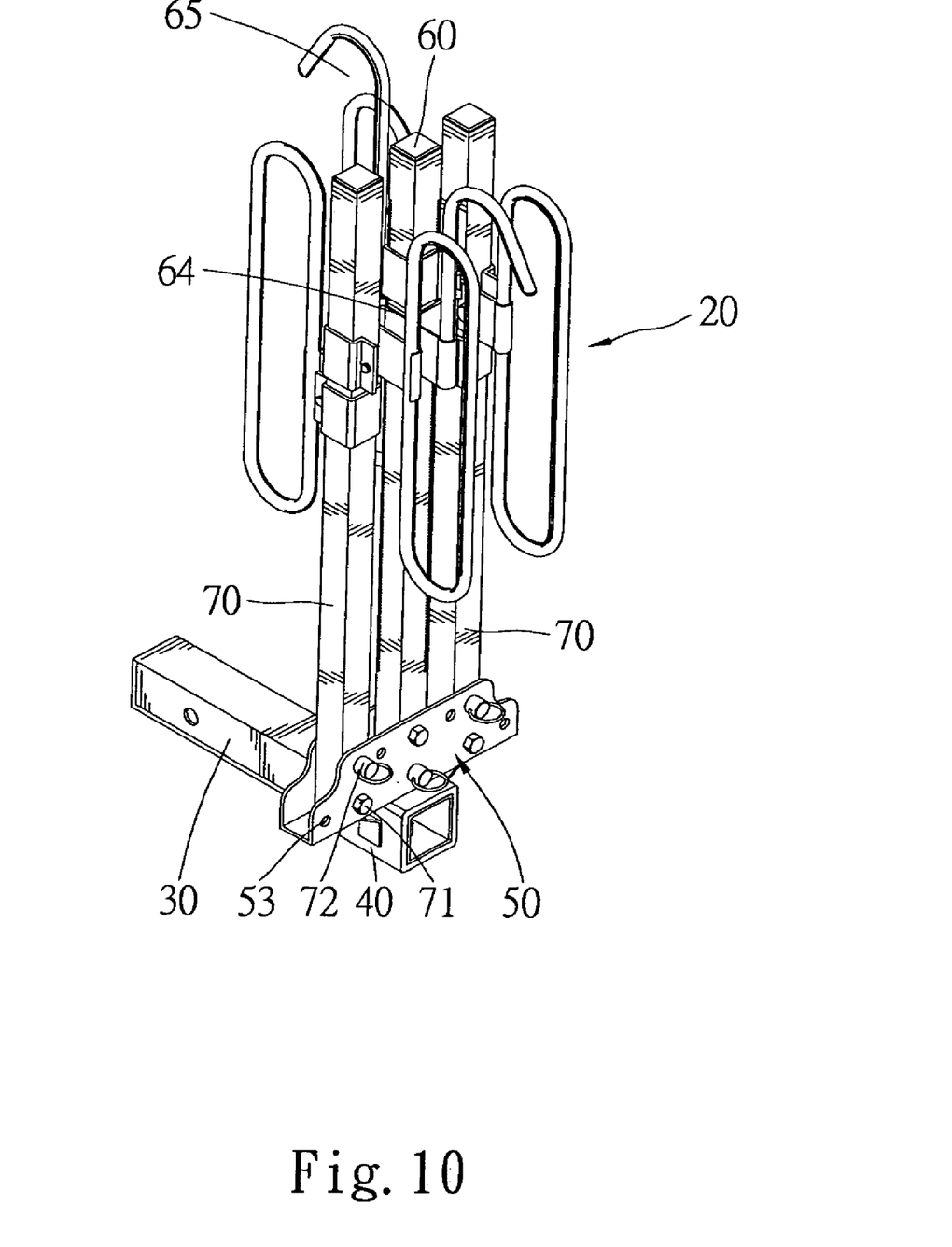
FIG. 10 is similar to FIG. 9 but shows the rack in a different position.

A screw 71 is driven in each beam 70 through one aperture 53 of each wall 51. Thus, the beams 70 are pivotally connected with the base 50. Each screw 71 is engaged with a nut 76. A pin 72 can be inserted in each beam 70 through one aperture 53 of each wall 51 so as to keep each beam 70 in a horizontal position or vertical position (FIG. 10).

Each supporting device 73 includes a collar 74 and an oval ring 75 secured to the collar 74. The collar 74 is put movably on one beam 70. The collar 74 can be secured to one beam 70 by a screw 77. The oval ring 73 can support one wheel 16 of the bicycle 14.

Figure 9:
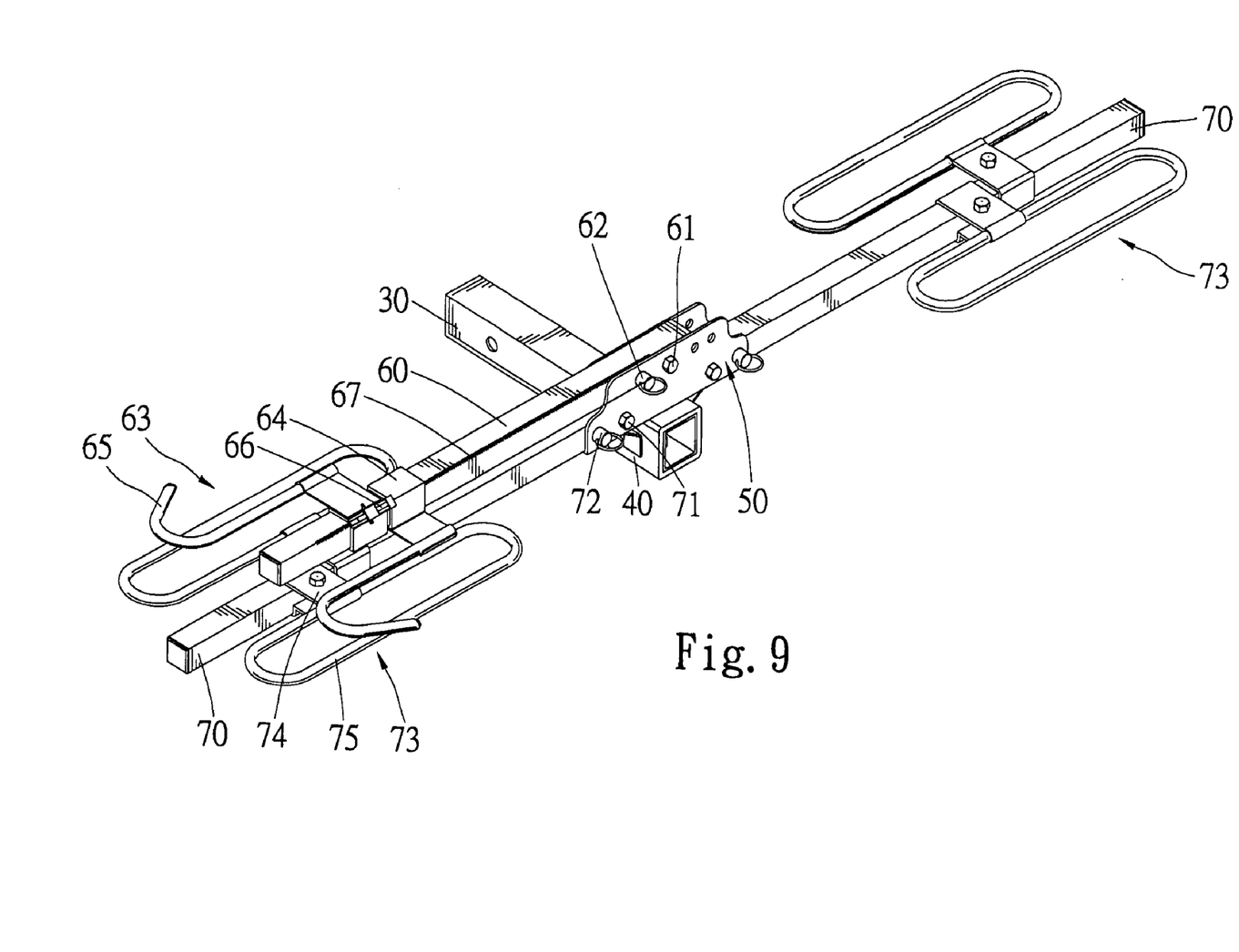
FIG. 9 is similar to FIG. 3 but shows the rack in a different position.

A screw 61 is driven in the post 60 through one aperture 53 of each wall 51. Thus, the post 60 is pivotally connected with the base 50. The screw 61 is engaged with a nut (not shown). A pin 62 can be inserted in the post 60 through one aperture 53 of each wall 51 so as to keep the post 60 in a horizontal position (FIG. 9) or vertical position.

Each hooking device 63 includes a collar 64 and a hook 65 secured to the collar 64. The collar 64 is put movably on the post 60. The oval hook 65 can hook the upper tube 15 of the bicycle 14. Now, each collar 64 can be locked in position on the post 60 by a locking device 66.

Figure 5:
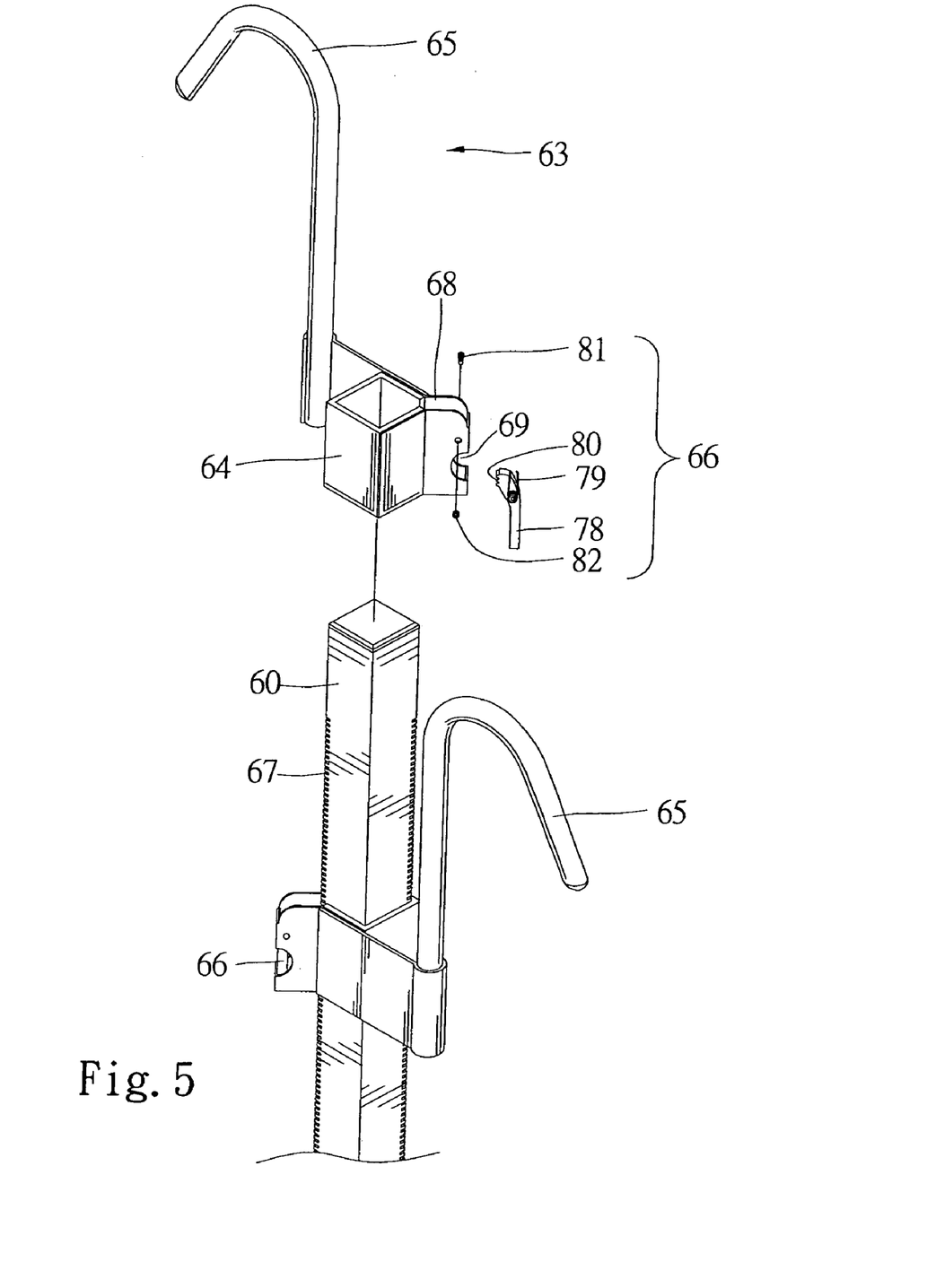
FIG. 5 is an enlarged partial view of the rack shown in FIG. 4.

Referring to FIG. 5, two series of teeth 67 are formed on the post 60. A shell 68 is formed on each collar 64. A window 69 is defined in each shell 68. Each locking device 66 includes a detent 78 pivotally put in one shell 68 and a spring 79 for biasing the detent 78 towards the post 60. The detent 78 is formed with teeth 80 for engagement with the teeth 67. A screw 81 is driven in each detent 78 through one shell 68. Thus, each detent 78 is pivotally put in one shell 68. Each screw 81 is engaged with a nut 82.

Figure 6:
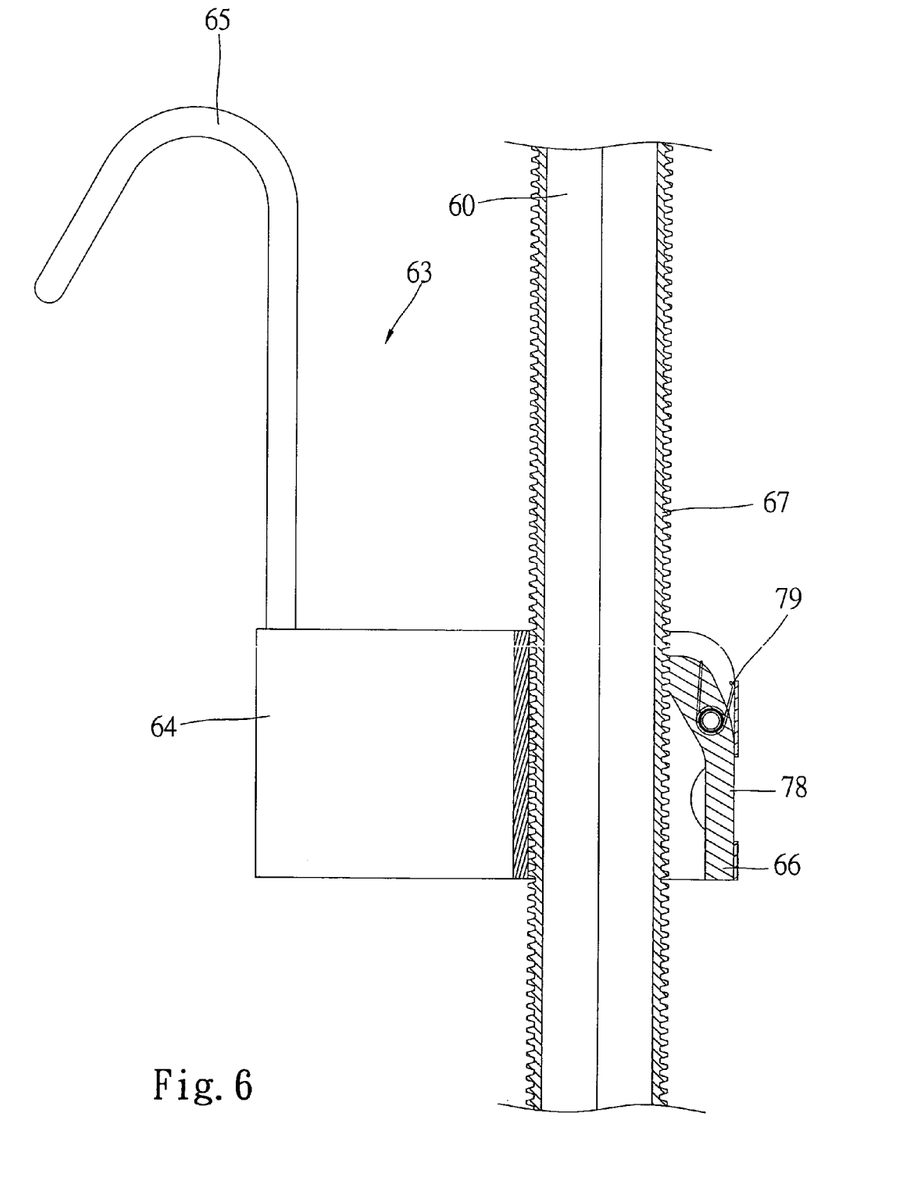
FIG. 6 is a cross-sectional view of the rack shown in FIG. 5.

Referring to FIG. 6, the teeth 80 are engaged with the teeth 67 so that each hooking device 63 is locked in position on the post 60.

Figure 7:
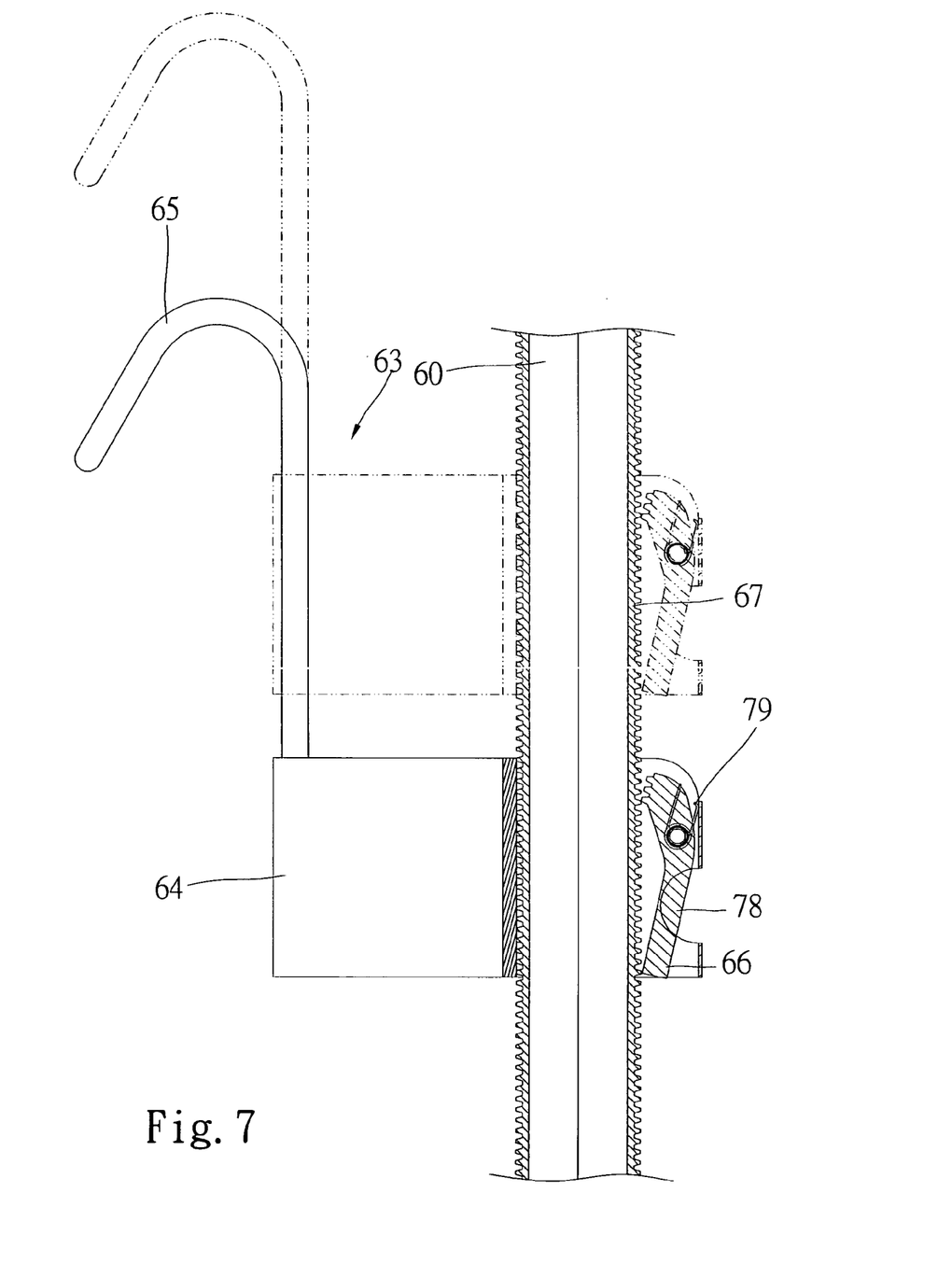
FIG. 7 is similar to FIG. 6 but shows the rack in a different position.

Referring to FIG. 7, through the window 69, the detent 78 can be pivoted in order to disengage the teeth 80 from the teeth 67. Thus, each hooking device 63 is allowed to slide on the post 60.

Figure 8:
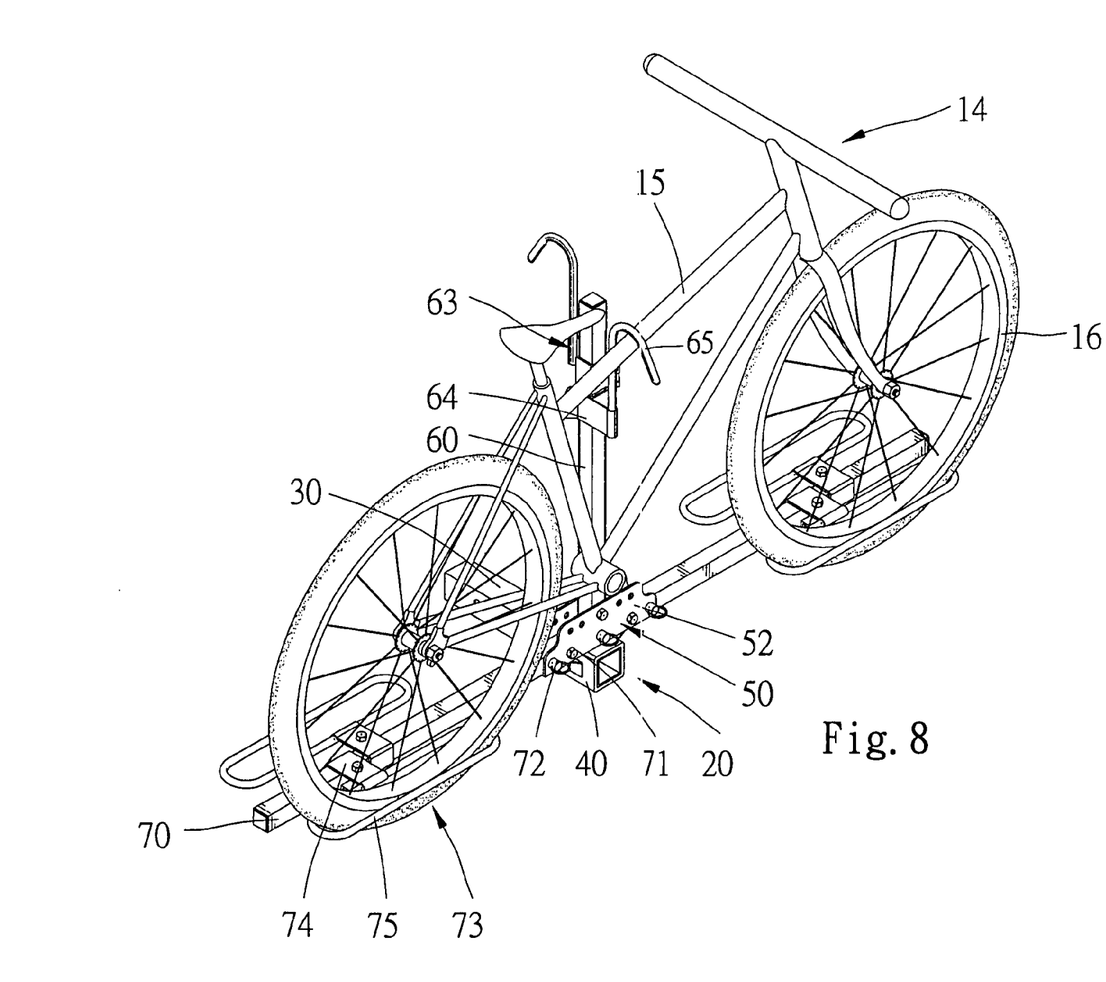
FIG. 8 is an enlarged perspective view of the bicycle and the rack shown in FIG. 1.

Referring to FIG. 8, each wheel 16 is held by one oval ring 75. The upper tube 15 is hooked by one hook 65.

The present invention has been described via detailed illustration of some embodiments. Those skilled in the art can derive variations from the embodiments without departing from the scope of the present invention. Therefore, the embodiments shall not limit the scope of the present invention defined in the claims.

What is claimed is:

1. A rack for holding at least one bicycle in position, the rack comprising:
    a base, wherein the base comprises a bottom and two spaced, parallel walls extending from the bottom, wherein each of the two walls comprises a plurality of apertures;
    two beams independently pivotally connected with the base, wherein an internal end of each of the two beams is located between the two walls and is pivotally mounted by a screw extending through corresponding apertures of the two walls and driven into the internal end;
    at least one supporting device attached to each of the two beams in order to support one wheel of the bicycle;
    a post pivotally connected with the base, wherein a lower end of the post is located between the two walls and is pivotally mounted by a screw extending through corresponding apertures of the two walls and driven into the lower end of the post, with the screw of the post being spaced from and parallel to the screws of the two beams,
    a hooking device attached to the post in order to hook the bicycle;
    first and second pins received in corresponding apertures of the two walls and extending through the two beams spaced from and parallel to the screws pivotally mounting the two beams; and
    a third pin received in corresponding apertures of the two walls and extending through the post and spaced from and parallel to the screw pivotally mounting the post, with the plurality of apertures receiving the first, second and third pins keeping the two beams and the post in position.

2. The rack according to claim 1 comprising a socket secured to a vehicle, an insert for insertion in the socket and a collar having annular cross sections for receiving the insert, wherein the collar is secured to the bottom of the base.

3. The rack according to claim 2 wherein the collar comprises two wings extending from two sides thereof for firmly supporting the bottom of the base spaced from the collar.

4. The rack according to claim 1 wherein the supporting device comprises a collar having annular cross sections put around each of the beams and an oval ring secured to the collar in order to support the wheel.

5. The rack according to claim 4 comprising a screw for locking the collar in position on each of the beams.

6. The rack according to claim 1 wherein the hooking device comprises a collar having annular cross sections put around the post and a hook secured to the collar in order to hook the bicycle.

7. The rack according to claim 6 comprising a locking device for locking the hooking device in position on the post.

8. The rack according to claim 7 wherein the locking device comprises a detent installed on the collar for engagement with the post.

9. The rack according to claim 8 wherein the post comprises a plurality of teeth formed thereon, wherein the detent comprises a plurality of teeth for engagement with the teeth of the post.

10. The rack according to claim 9 wherein the detent is pivotally connected with the collar.

11. The rack according to claim 10 wherein the locking device comprises a spring for biasing the detent.

12. The rack according to claim 11 wherein the locking device comprises a housing formed on the collar, wherein the detent is pivotally mounted in the housing.

13. The rack according to claim 12 wherein the housing comprises a window defined therein, wherein the detent is accessed to through the window.

14. The rack according to claim 1 further comprising another supporting device attached to each of the two beams independent of the supporting device; and another hooking device attached to the post independent of the hooking device.

15. The rack according to claim 14 wherein each hooking device comprises a collar having annular cross sections put around the post and a hook secured to the collar in order to hook the bicycle, with the collars of the hooking device and the other hooking device being independently movable along the post.

16. The rack according to claim 15 wherein each supporting device comprises a collar having annular cross sections put around each of the beams and an oval ring secured to the collar in order to support the wheel, with the collars of the supporting device and other support device being independently movable along the post.

17. The rack according to claim 16 comprising a socket secured to a vehicle, an insert for insertion in the socket and a collar having annular cross sections for receiving the insert, wherein the collar is secured to the bottom of the base.

18. The rack according to claim 17 wherein the collar comprises two wings extending from two sides thereof for firmly supporting the bottom of the base spaced from the collar.

19. The rack according to claim 18 comprising a locking device for locking the hooking device in position on the post, wherein the locking device comprises a detent installed on the collar for engagement with the post, wherein the post comprises a plurality of teeth formed thereon, wherein the detent comprises a plurality of teeth for engagement with the teeth of the post, wherein the detent is pivotally connected with the collar, and wherein the locking device comprises a spring for biasing the detent.

20. The rack according to claim 14 wherein each supporting device comprises a collar having annular cross sections put around each of the beams and an oval ring secured to the collar in order to support the wheel, with the collars of the supporting device and other support device being independently movable along the post.

* * * * *